US005520275A

United States Patent [19]

Foglino

[11] Patent Number: 5,520,275

[45] Date of Patent: May 28, 1996

[54] METHOD AND DEVICE FOR SERVICING A TERMINAL

[75] Inventor: Jean-Jacques Foglino, Peynier, France

[73] Assignee: Gemplus Card International, Gemenos, France

[21] Appl. No.: 256,039

[22] PCT Filed: Dec. 17, 1992

[86] PCT No.: PCT/FR92/01200

§ 371 Date: Jun. 17, 1994

§ 102(e) Date: Jun. 17, 1994

[87] PCT Pub. No.: WO93/12510

PCT Pub. Date: Jun. 24, 1993

[30] Foreign Application Priority Data

Dec. 17, 1991 [FR] France .................................. 91 15659

[51] Int. Cl.[6] .............................. G07F 7/08; G06F 13/10

[52] U.S. Cl. .......................... 194/217; 235/381; 235/382; 340/825.31; 340/825.35; 364/479

[58] Field of Search .................................... 194/215, 216, 194/217, 218, 900; 235/380, 381, 382, 382.5; 364/478, 479; 340/825.31, 825.34, 825.35

[56] References Cited

U.S. PATENT DOCUMENTS

| | | | |
|---|---|---|---|
| 4,369,442 | 1/1983 | Werth et al. | 194/217 X |
| 4,471,905 | 9/1984 | Sloma et al. | 232/12 |
| 4,598,378 | 7/1986 | Giacomo | 364/479 |
| 4,598,810 | 7/1986 | Shore et al. | 364/479 X |
| 4,654,513 | 3/1987 | Hennessy | 235/381 |
| 4,767,917 | 8/1988 | Ushikubo | 235/381 |
| 4,845,484 | 7/1989 | Ellsberg | 340/825.35 |
| 4,907,250 | 3/1990 | Ricks | 194/217 X |
| 4,908,769 | 3/1990 | Vaughan et al. | 340/825.35 X |
| 5,147,021 | 9/1992 | Maruyama et al. | 194/217 |
| 5,293,030 | 3/1994 | Dietrich et al. | 235/381 |
| 5,415,264 | 5/1995 | Menoud | 194/217 |

FOREIGN PATENT DOCUMENTS

| | | |
|---|---|---|
| 0284133 | 9/1988 | European Pat. Off. . |
| 0392731 | 10/1990 | European Pat. Off. . |
| 0391302 | 10/1990 | European Pat. Off. . |
| 0413636 | 2/1991 | European Pat. Off. . |
| WO92/06451 | 4/1992 | WIPO . |

*Primary Examiner*—David A. Bucci
*Assistant Examiner*—Scott L. Lowe
*Attorney, Agent, or Firm*—Nilles & Nilles

[57] ABSTRACT

A device for servicing a vending machine including i) a chip card reader for receiving payments to the vending machine and transferring information elements from the vending machine to the device, ii) a servicing door, and iii) a lock for preventing opening of the servicing door. The device includes I) a portable secured servicing medium for servicing the vending machine, the portable secured servicing medium including A) a memory; B) a programmed microprocessor; C) a structure for the exchange of information elements between the portable secured servicing medium and the vending machine; and D) an end with a credit card format so that the portable secured servicing medium can be inserted into the chip card reader; II) a structure for transferring information elements pertaining to a state of the vending machine into the memory from the vending machine, before the device services the vending machine; and III) structure for unlocking the lock, after information elements pertaining to the state of the vending machine are transferred into the memory.

21 Claims, 2 Drawing Sheets

METHOD AND DEVICE FOR SERVICING A TERMINAL

BACKGROUND OF THE INVENTION

1. Field of the Invention

An object of the invention is a method of servicing a terminal delivering goods or services. In a preferred example, the terminal is a parking meter or a clock meter. However, it may be any type of automatic dispenser of goods or services such as a dispenser of beverages or even a counter connected to an information retrieval service managing a database. The terminals concerned by the invention comprise at least one device for payment by chip card and, in certain cases, a combined device for payment by chip card and direct payment by cash, coins or bank notes, or by magnetic card. Payment by chip card may be done by the counting out of units that are prepaid and recorded in a memory of the card. In this case the card is a chip card with at least a memory. Or else, the payment is done by debiting from a bank account. In this case, the card is a bank-type card which may be a magnetic card or a chip card.

2. Discussion of the Related Art

The problems encountered with this type of combined payment device relate to the monitoring of the employees who have to regularly service the terminals, for example in order to make withdrawals therefrom of cash inserted by users. Indeed, in varying degrees, the payments made by the users are made in cash. The terminal therefore normally delivers three types of account statements in three counters. A first type of account in a first counter relates to the quantity of services delivered. A second type of account in a second counter represents payment by card (so-called electronic money) and a third type of account in a third counter, when such a counter is present, indicates the amount in cash that the employee has to collect and, of course, hand over to the authority managing the terminal. The total of the latter two counters should be equal to the total of the first counter. It is suspected that unscrupulous employees might be led to fiddle with the second counter so as to increase its value with a view to keeping the cash corresponding to the difference created. There are devices, known through the documents EP-A-0 391 302 and U.S. Pat. No. 4,471,905, for removing cash stored in a terminal. These devices, however, provide no information on the state of the terminal, notably when there is no money to be taken out. Furthermore, in order to be put to use, they require specific adjustments to be made to the terminal.

It is also feared that other servicing operators might take advantage of the complexity of a system such as this to cheat the authorities responsible for managing large groups of terminals. Indeed, in a big city, it may be assumed that there are several thousand terminals of such a type, even if it be to deliver only one type of item: for example parking tickets. These terminals could go out of order or might require preventive maintenance. A firm unrelated to these managing authorities may therefore be entrusted with these operations. This firm may draw up servicing reports in which they may claim to have carried out costly operations, for example the changing of a printer of parking tickets when no such operation has been carried out.

There is a system and a method, known from the document EP-A-0 413, for checking the collection of money from prepayment terminals. This system comprises electronic means of interfacing with the terminal for the tapping therefrom of information elements contained in this terminal. These electronic means are very costly in their design, notably because they have a screen and even a keyboard. In practice, systems of this type are connected to a specific input of the terminal. For this purpose, this document provides notably for an input by infrared means. The presence, in itself, of a specific input of the system constitutes a weakness of the system with respect to fraudulent individuals for, in any case, it provides another additional way of gaining access to the system, whatever may be the precautions taken to protect this other way of access.

SUMMARY OF THE INVENTION

In the invention, these problems of fraudulent behavior are resolved by asking the servicing operators to insert a secured or tamper-proof servicing medium of the chip card type and format into the chip card reader of the terminal. This terminal therefore necessarily has a chip card reader. The secured medium therefore has one end with a chip card format if it is not itself a chip card. This end is the one inserted into the chip card reader. The secured medium is then recognized as a servicing chip card by the terminal. This recognition may be prompted by the servicing operator who may furthermore use control buttons of the terminal. This recognition may also preferably be done automatically, as soon as the secured medium is introduced, on the initiative of the terminal or of a microprocessor contained in the secured servicing medium. These checks, which are of a known type, will naturally result, where necessary, in an unlocking of a logic lock or a physical lock of the door type in the terminal so that the servicing operator can do what he has to do therein. In the invention, after the recognition and before the unlocking, when necessary, information is entered into the servicing operator's secured medium on the state of the terminal, notably the values of balances when routine statements of accounts are involved, or notably the values of state registers representing the operational condition of the different elements of this terminal when the servicing operation is a maintenance operation, for example. It may not be necessary to open the terminal if the cash contained therein is insufficient to warrant an emptying of the box containing the cash. In this case, all that is transferred into the chip card is information on the states of the counters.

When the recognition is made, it is even possible, in a known way, for a recognition protocol to determine the type of servicing action to be undertaken, transfer only information elements pertaining to this servicing operation and, of course, open only that door of the terminal which corresponds to this servicing action.

This system then has the advantage whereby the servicing operator has nothing to do: everything is done by the microprocessor of the card in carrying out the pre-recorded program contained in the card. This system is thus not only simple but also appears as a black box to the servicing operator who has no way of affecting this program in any way and is incapable of falsifying it. This would not be the case if this program had been loaded into the memory of a microcomputer as cited in the document EP-A-0 413 636. Indeed, in this case, the servicing operator may be tempted to modify this program. This chip card therefore has the advantage of being readable by the payment means of the apparatus and of being itself a very high-security system.

An object of the invention therefore is a method of servicing a terminal delivering goods or services, said terminal comprising a chip card reader with which payment for goods or services is made to the terminal, characterized in that it comprises:

the insertion of a secured servicing medium having a chip card format into said chip card reader of the terminal, this secured medium comprising a memory, a micro-programmed microprocessor and means for the exchange of information elements with the terminal, then the authorization of the servicing operation by the comparison of a secret code relating to the terminal with a secret code relating to the medium, and a step, subsequent to the insertion of the secured medium, during which the terminal carries out a transfer, into a recording memory of the secured medium, of the information elements pertaining to the state of this terminal before the servicing operation.

BRIEF DESCRIPTION OF THE DRAWINGS

The invention will be understood more clearly from the following description and from the figures that accompany it. These figures are given purely by way of an indication and in no way restrict the scope of the invention. Of these figures.

DESCRIPTION OF PREFERRED EMBODIMENTS

Figure 1:
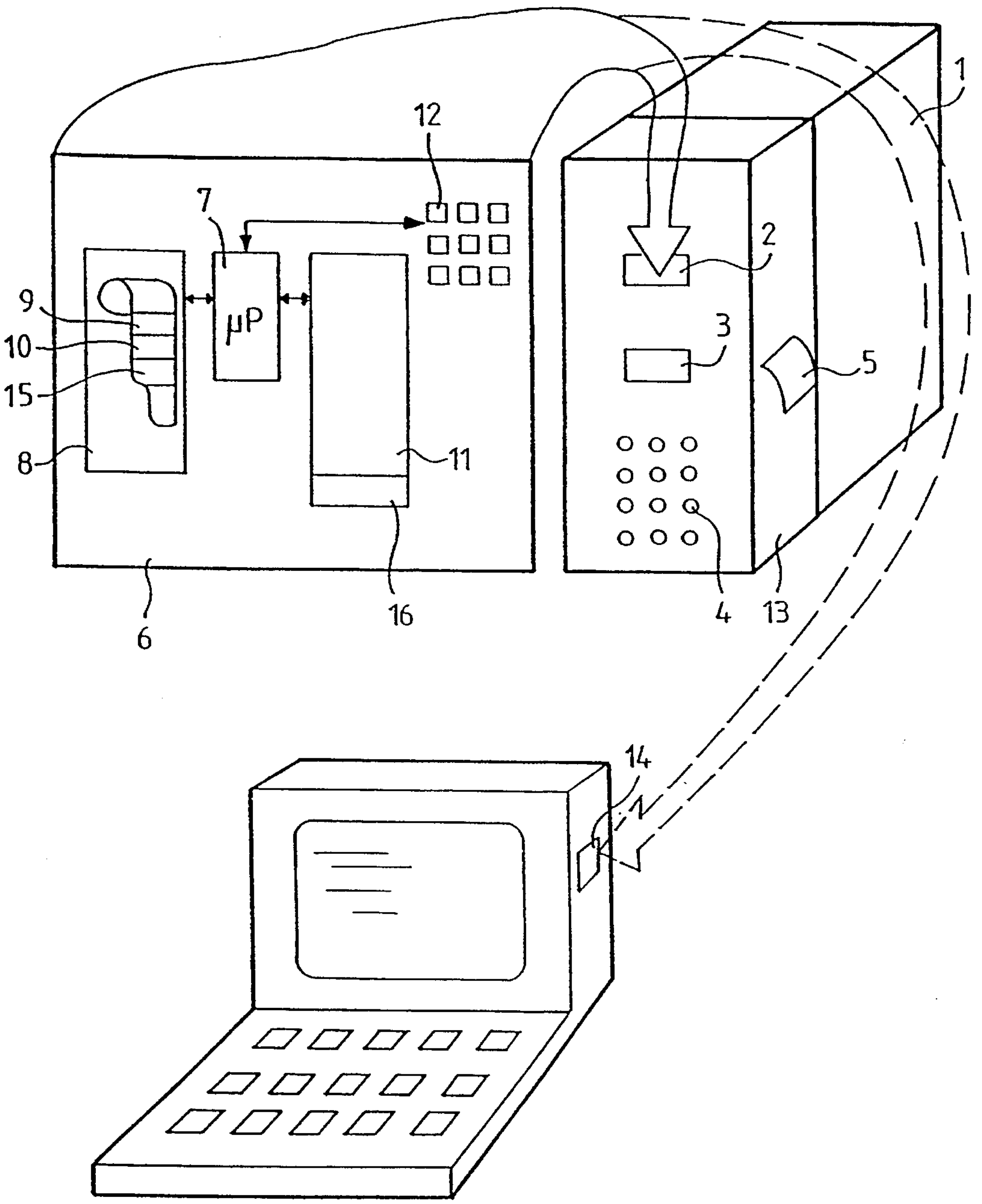
FIG. 1 shows a device that can be used to implement the invention.

FIG. 1 shows a device that can be used to implement the invention. This device comprises a terminal 1 provided with a chip card reader 2 and, in certain cases, a slot 3 or a similar device for the insertion of cash into the terminal. The terminal also has a number of control buttons such as the button 4 used to choose from among several goods or services or to cancel the operation. The terminal is therefore linked with a dispenser of these goods or services. In this case, in an application related to payment for parking places, the terminal delivers a parking ticket 5 corresponding to a period of time chosen by a user. The user places this ticket so that it can be clearly seen behind the windscreen of his vehicle, so that wardens can ascertain that the vehicle is entitled to be parked.

Figure 2:
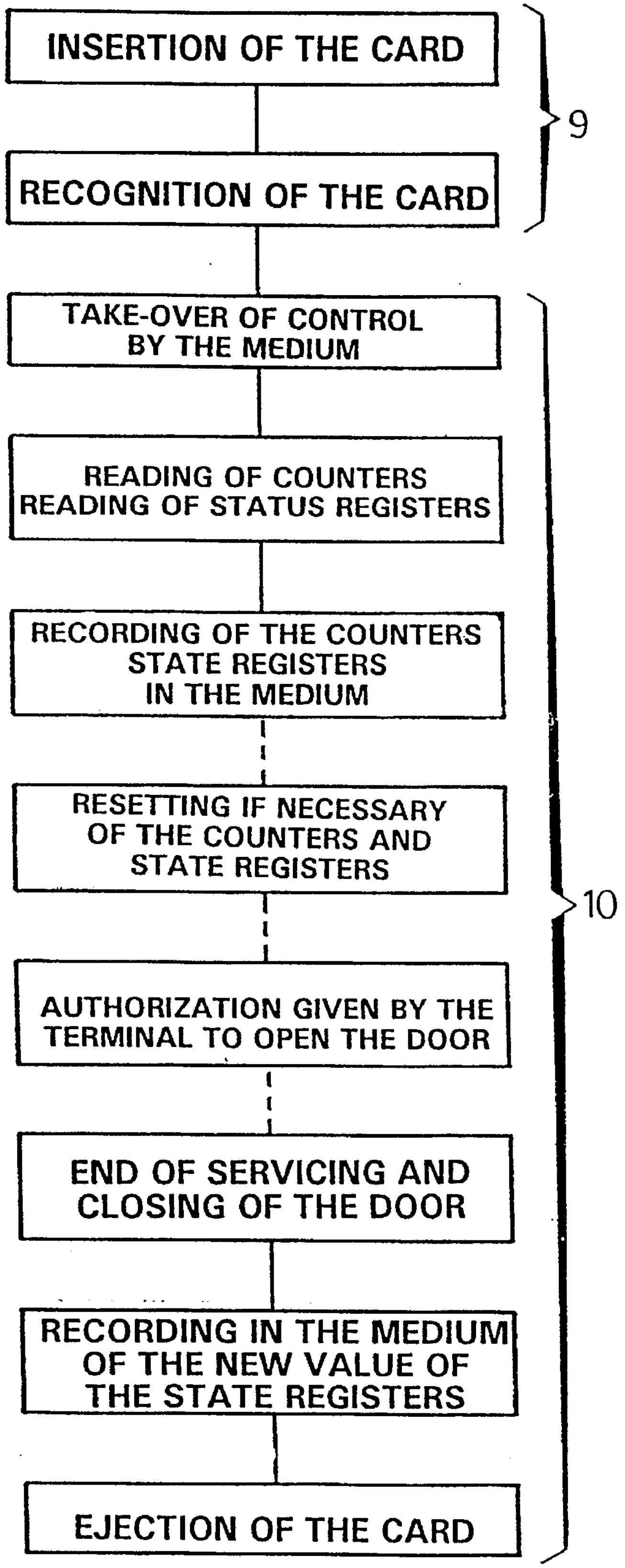
FIG. 2 is a flow chart of the operations of the invention.

During servicing operations on the terminal, servicing operators insert a secured servicing medium 6, having an end with a chip card format, into a chip card reader of the terminal, for example the reader 2. This secured medium 6 has a microprocessor 7 linked to a programmed memory 8, with a data memory 11 and with contact pads such as 12 needed to set up a link with the reader 2. In certain cases, there are no contact pads: the link is set up by electromagnetic waves. The programmed memory 8 has two programs. According to the flow chart of FIG. 2, a first program 9 is a recognition program, for example a standard type of response recognition program. In a recognition of this type, the terminal interrogates the medium. The medium responds by sending out its identification or its secret code which is stored in a part 16 of its memory 11. The microprocessor 7 may, if need be, encipher the secret code of the medium before sending it to the reader 2. In this case, the reader 2 must be provided with deciphering means. A program such as this is described for example in a European patent application EP-A-0 284 133.

Since the terminal 1 is provided with a keyboard 4, it is possible, for this recognition, to use this keyboard 4 to ask the servicing operator to authenticate his action. The operator uses this keyboard to indicate his personal code. This personal code, which may be the same as that of the card or another code, is compared by the terminal 1 or the microprocessor 7 of the card with a carrier code contained in the card or even with a code contained in the terminal. This prevents a situation where a servicing chip card that has been lost might be used by a thief to ransack the terminals and remove the cash that has been received therein. This also makes it possible to detect the presence of spurious terminals since the terminal caries out a check on the card while the card carries out a check on the terminal.

A second program 10 contained in the memory 8 is also a program of the invention: it is aimed at prompting the transfer, after the authentication operations, of the information elements contained in the counters or state registers of the terminal 1 into the memory 11 of the secured medium. Preferably, as soon as it is inserted into the reader 2, the microprocessor 7 goes into a position of standing by for a response. As soon as the recognition protocol is ended, the microprocessor 7 of the medium 6 takes over control of the terminal. This takeover is quite simply achieved by the fact that, after the recognition, the reader 2 goes into a state of standing by for a command. To this effect, the program 9 of the card may, for example, then include, at the end, a time-lag instruction relating to a calibrated period at the end of which the program 10 of the card is activated. Under the effect of the instructions of this program 10, the microprocessor 7 then reads the contents of the counters and/or the contents of the state registers of the terminal. Then it records these information elements read in the memory 11 of the medium. When these recordings are made, the microprocessor 7 sends a command to the reader 2 so that this reader 2 prompts the unlocking of a logic lock or a physical lock that prevents the opening of a door 13 of the terminal and hence the progress of the desired servicing operation.

The program 10 may also contain instructions for the resetting of the counters or state registers of the reader 2. As an alternative, the program 10 includes instructions to modify a consumption price list with the terminal. These instructions are carried out, where necessary, before the door is opened. However, this is not indispensable. The program 10 preferably includes instructions to record the information elements pertaining to the terminal in an enciphered form in the memory 11. Consequently, these information elements are not even directly comprehensible to an operator who would limit his action to reading the memory 11 as such. The enciphering is of the same type as the one used to encipher the secret code in the program 9 before it is sent.

When the servicing operation is over and when the door of the terminal has been closed again, the rest of the program 10 may include instructions designed for the re-recording in the memory 11, at places other than those indicated hereabove, of the values of the state registers resulting from the servicing operation. Thereafter, the card is pushed out of the reader 2.

To simplify the servicing operations, the microprocessor 7 may preferably be made to carry out all the necessary operations. In the event of a change in the program, it is then easier to change the medium 6 than it is to change the terminal 1.

To read the memory 11 by means of a reader 14 available to the authorities managing the terminal 1 and the media 6, the performance of a third program 15 is activated in the medium 6. In this program 15, the microprocessor 7 of the medium 6 ascertains that the reader 14 that is interrogating it is an authorized reader. If this is the case, the program 15 includes instructions for the writing, in a memory of the reader 14, if need be after deciphering, of the information elements recorded in its memory 11. In this way, the authorities managing the terminals have precise reports on the operations carried out by the servicing operators.

What is claimed is:

1. A device for servicing a vending machine, the vending machine including i) a chip card reader for receiving payments to the vending machine and transferring information elements from the vending machine to the device, ii) a servicing door, and iii) a lock for preventing opening of the servicing door, the device comprising:

I) a portable secured servicing medium for servicing the vending machine, the portable secured servicing medium including
A) a memory;
B) a programmed microprocessor;
C) a means for the exchange of information elements between the portable secured servicing medium and the vending machine; and
D) an end with a credit card format so that the portable secured servicing medium can be inserted into the chip reader;

II) a means for transferring information elements pertaining to a state of the vending machine into the memory from the vending machine, before the device services the vending machine; and III) a means for unlocking the lock, after information elements pertaining to the state of the vending machine are transferred into the memory.

2. The device according to claim 1, wherein, to read the memory of the portable secured servicing medium, the device further comprises:

IV) a means for inserting the device into a reader that is connected to a keyboard for entering an access code that provides read access to the portable secured servicing medium;

V) a means for comparing the access code with a read access code contained in the portable secured servicing medium; and VI) a means to authorize the reading of the memory of the portable secured servicing medium as a function of a result of comparing the access code with the read access code.

3. The device according to claim 1, wherein the portable secured servicing medium includes a programmed microprocessor for comparison of access codes.

4. The device according to claim 1, wherein the device further comprises:

IV) a means for enciphering information data elements pertaining to the state of the vending machine while the means for transferring is transferring information elements pertaining to the state of the vending machine into the memory from the vending machine.

5. The device according to claim 1, wherein the device further comprises:

IV) a means for obtaining authorization, for the device to service the vending machine, from a keyboard that is part of the vending machine.

6. The device according to claim 1, wherein the device further comprises:

IV) a means for writing a new configuration in the vending machine when the device services the vending machine.

7. The device according to claim 1, wherein the secured portable medium is a chip card.

8. The device according to claim 7, wherein, to read the memory of the portable secured servicing medium, the device further comprises:

IV) a means for inserting the device into a reader that is connected to a keyboard for entering an access code that provides read access to the portable secured servicing medium;

V) a means for comparing the access code with a read access code contained in the portable secured servicing medium; and VI) a means to authorize the reading of the memory of the portable secured servicing medium as a function of a result of comparing the access code with the read access code.

9. The device according to claim 7, wherein the secured portable medium includes a programmed microprocessor for comparison of access codes.

10. The device according to claim 7, wherein the device further comprises:

IV) a means for enciphering information data elements pertaining to the state of the vending machine while the means for transferring is transferring information elements pertaining to the state of the vending machine into the memory from the vending machine.

11. The device according to claim 7, wherein the device further comprises:

IV) a means for obtaining authorization, for the device to service the vending machine, from a keyboard that is part of the vending machine.

12. The device according to claim 7, wherein the device further comprises:

IV) a means for writing a new configuration in the vending machine when the device services the vending machine.

13. A method of servicing terminals comprising:

I) providing at least one terminal having
A) a chip card reader for making payment to the terminal, the chip card reader including means for transferring information elements from the terminal;
B) a servicing door, and
C) a lock for preventing opening of the servicing door;

II) providing at least one device having
A) a portable secured servicing medium for servicing the at least one terminal, the portable secured servicing medium including
1) a memory;
2) a programmed microprocessor;
3) a means for the exchange of information elements between the portable secured servicing medium and the at least one terminal; and
4) an end with a credit card format so that the portable second servicing medium can be inserted into the chip card reader;
B) a means for transferring information elements pertaining to a state of the at least one terminal into the memory from the at least one terminal, before the device services the at least one terminal; and
C) a means for unlocking the lock, after information elements pertaining to the state of the at least one terminal are transferred into the memory; and III) inserting the portable secured servicing medium into the chip card reader;

IV) recognizing the device by the at least one terminal;

V) transferring information elements pertaining to the state of the at least one terminal into the memory from the at least one terminal; and then VI) servicing the at least one terminal, said servicing including unlocking the lock and opening the servicing door.

14. The method according to claim 13, further comprising

VII) providing at least one reader for the insertion therein of the portable secured servicing medium, said at least one reader including a keyboard for entering an access code that provides read access to the portable secured servicing medium;

VIII) inserting the device into the at least one reader;

IX) entering, through the keyboard, the access code that provides read access to the portable secured serving medium;

X) comparing the access code with a read access code contained in the portable secured servicing medium; and XI) authorizing the reading of the memory of the portable secured servicing medium as a function of a result of comparing the access code with the read access code.

15. The method according to claim 13, further comprising

VII) enciphering information data elements pertaining to the state of the at least one terminal with the means for transferring is transferring information elements pertaining to the state of the at least one terminal into the memory from the at least one terminal.

16. The method according to claim 13, further comprising

VII) writing a new configuration in the at least one terminal when the device services the at least one terminal.

17. The method according to claim 13, further comprising

VII) providing at least one reader for the insertion therein of the portable secured servicing medium, said at least one reader including a keyboard for entering an access code that provides read access to the portable secured servicing medium;

VIII) inserting the at least one device into the at least one reader;

IX) entering, through the keyboard, the access code that provides read access to the portable secured servicing medium;

X) comparing the access code with a read access code contained in the portable secured servicing medium;

XI) authorizing the reading of the memory of the portable secured servicing medium as a function of a result of comparing the access code with the read access code; and XII) enciphering information data elements pertaining to the state of the at least one terminal while the means for transferring is transferring information elements pertaining to the state of the at least one terminal into the memory from the at least one terminal.

18. The method according to claim 13, further comprising

VII) providing at least one reader for the insertion therein of the portable secured servicing medium, said at least one reader including a keyboard for entering an access code that provides read access to the portable secured servicing medium;

VIII) inserting the at least one device into the at least one reader;

IX) entering, through the keyboard, the access code that provides read access to the portable secured servicing medium;

X) comparing the access code with a read access code contained in the portable secured servicing medium;

XI) authorizing the reading of the memory of the portable secured servicing medium as a function of a result of comparing the access code with the read access code; and VII) writing a new configuration in the at least one terminal when the at least one device services the at least one terminal.

19. The method according to claim 13, further comprising

VII) enciphering information data elements pertaining to the state of the at least one terminal while the means for transferring is transferring information elements pertaining to the state of the at least one terminal into the memory from the at least one terminal; and VIII) writing a new configuration in the at least one terminal when the at least one device services the at least one terminal.

20. A system for servicing terminals comprising:

I) at least one terminal including

A) a first chip card reader for making payment to the terminal, the chip card reader including means for transferring information elements from the terminal;

B) a servicing door;

C) a lock for preventing opening of the servicing door; and

D) a keyboard for entering a servicing operator's code;

II) at least one device including

A) a portable secured servicing medium for servicing the at least one terminal, the portable secured servicing medium including 1) a memory;

2) a programmed microprocessor;

3) a means for the exchange of information elements between the portable secured servicing medium and the at least one terminal; and 4) an end with a credit card format so that the secured portable medium can be inserted into the chip card reader;

B) a means for transferring information elements pertaining to a state of the at least one terminal into the memory from the at least one terminal, before the at least one device services the at least one terminal; and C) a means for unlocking the lock, after information elements pertaining to the state of the at least one terminal are transferred into the memory; and III) at least one reader for the insertion therein of the portable secured servicing medium, said at least one reader including a keyboard for entering an access code that provides read access to the portable secured servicing medium.

21. The system according to claim 20, wherein the at least one device is a chip card.

* * * * *